(No Model.)
A. F. BLESCH.
WATER CLOSET.
No. 354,379. Patented Dec. 14, 1886.
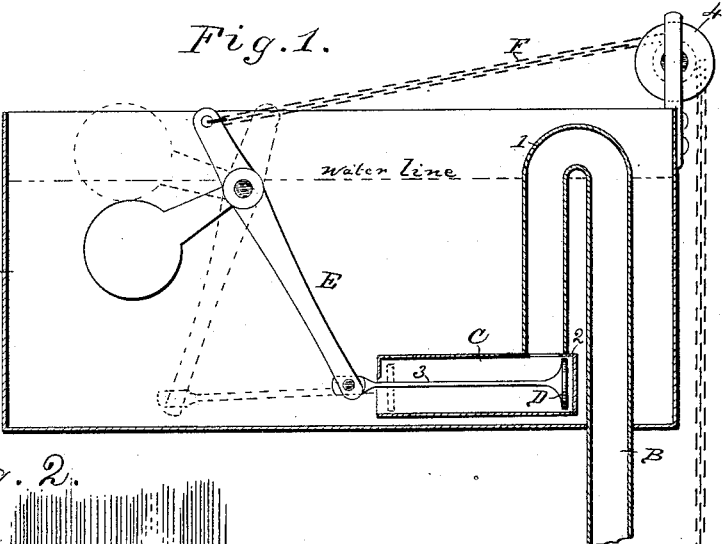
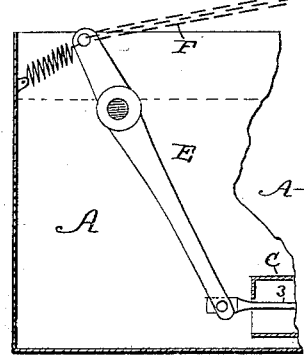
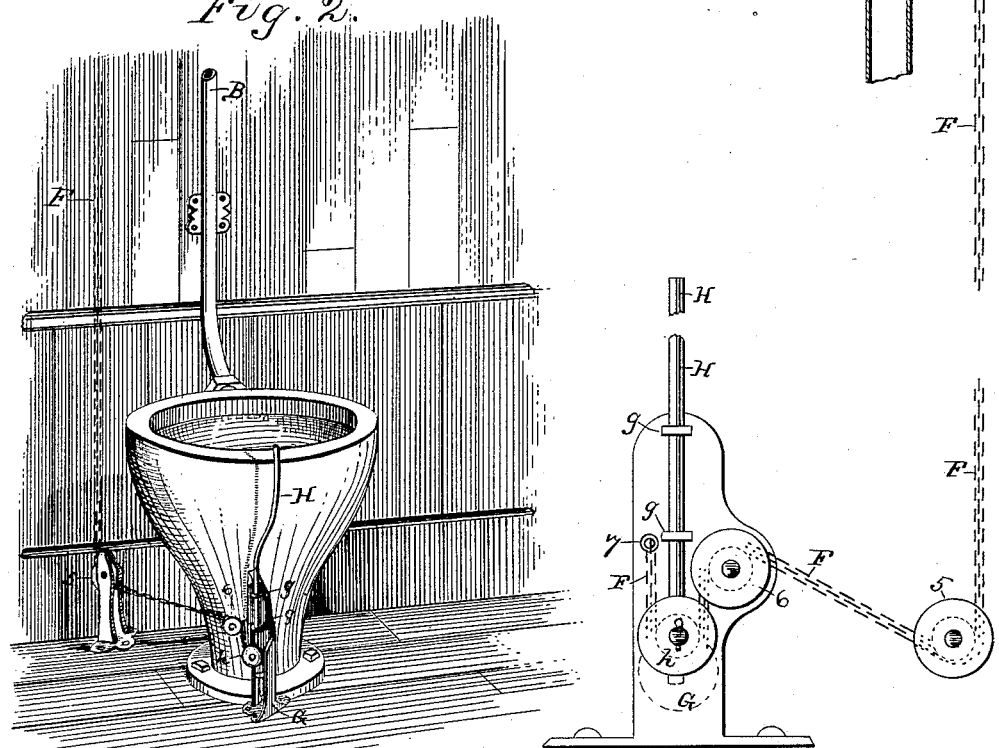
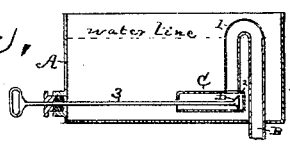
WITNESSES:
Thos. Houghton.
P. B. Turpin.
INVENTOR:
A. F. Blesch
BY Munn & Co.
ATTORNEYS.

UNITED STATES PATENT OFFICE.

AUGUST F. BLESCH, OF COLUMBUS, OHIO.

WATER-CLOSET.

SPECIFICATION forming part of Letters Patent No. 354,379, dated December 14, 1886.

Application filed March 6, 1886. Serial No. 194,341. (No model.)

*To all whom it may concern:*

Be it known that I, AUGUST F. BLESCH, of Columbus, in the county of Franklin and State of Ohio, have invented a new and useful Improvement in Water-Closets, of which the following is a specification.

My invention is an improvement in that class of water-closets which are supplied with flushing-tanks, and the invention seeks to provide a siphon communicating with the tank and suitable means whereby to start the same.

The invention consists in certain features of construction and combinations of parts, as will be hereinafter described and claimed.

In the drawings, Figure 1 is a detached view showing the tank, pipes, &c., in section and the tripping devices in side view. Fig. 2 is a perspective view showing a closet-bowl and the tripping devices in connection therewith, and Figs. 3 and 4 show modifications.

The tank A may be of ordinary construction, and may be properly filled by means of a ball-cock or in other suitable or well-known manner, as desired. The flushing-pipe B leads into the tank, as shown, and is connected with or suitably bent to form a siphon, as shown, the crown of which, as shown at 1, projects above the high-water line. With this siphon connects a chamber, C, which, for convenience of reference and because of its purpose, I call the "plunger" chamber. The plunger D is placed and movable longitudinally in this chamber C, which has a small extension, 2, in rear of its juncture with the siphon, for the purpose hereinafter described. In the construction shown this plunger has its rod 3 connected with one end of a lever, E, pivoted between its ends, and having its other end connected by chain F, or in other suitable manner, with the tripping devices. I provide the lever with a weight, which operates to secure it normally in the position shown. In operation, when the lever, plunger, &c., are in the dotted position indicated in Fig. 1, and the lever is released, the plunger will be, by the force of the weight, quickly moved in its chamber to the position shown in full lines in said figure, and will force a volume of water over the bend of and start the siphon. In the present instance the plunger is made of less diameter than the bore of its case, so the latter and the arm of the siphon connected with it may fill with water when the plunger is in the position dotted in Fig. 1. The extension 2 serves to receive the plunger when the latter has completed its operative stroke, and prevents the latter from offering any obstruction to the passage of the water.

It will be understood that a spring might be substituted for the weight for operating the lever, as is shown in Fig. 3; also, that instead of using the lever the plunger-rod might be operated in other ways—as, for instance, by extending it through suitable stuffing-boxes in the side of the case, so it could be operated by hand, if desired, as will be understood from Fig. 4, or by proper connection with the tripping devices. It is preferred, however, to use the lever, as shown, and the tripping devices, which will now be described.

To the upper end of the lever is connected one end of a chain, F, (or a cord may be substituted,) which extends over a pulley, 4, journaled above the tank, thence down under a guide-pulley, 5, journaled near the floor, thence over a guide-pulley, 6, and has its extremity secured at 7 to a support. In the construction shown the pulley 6 and point of connection 7 are supported on a frame, G, which has guides $g$ for a sliding rod, H. This rod has its upper end arranged in practice to be engaged by the seat of the closet when depressed. The lower end of this rod carries a pulley, $h$, which bears on the chain F, between the pulley 6 and point of connection of the chain. When the rod H is depressed, it will depress the chain between the points 6 and 7, and will draw the chain F a distance twice the length of movement of the rod H.

In operation when the piston is moved to the dotted position shown in Fig. 1, and is then moved quickly to that shown in full lines by means of the lever or otherwise, it will force a volume of water over the bend of and start the siphon.

It will be seen that if the chain is pulled but for an instant a thorough flushing of the closet will result.

It will be noticed that the plunger-case is approximately horizontal. The advantages resulting from this arrangement over a vertically-arranged plunger-case will be readily seen. In the first place it permits the water to pass to the siphon through the plunger-case by arranging the end of the plunger-case opposite that connected with the siphon close to the bottom of the tank, thus avoiding any perforations through the side of the plunger-case. Another advantage of this arrangement is that by providing for the movement of the plunger in a horizontal line said plunger may be operated with greater power by a given force than when it acts on the water in a vertical line. This arrangement of the case also enables the lever to be arranged almost wholly within the cistern, avoiding the projection thereof above the cistern, as will be seen.

Having thus described my invention, what I claim as new is—

1. The combination, with the tank and the siphon extended thereinto, of a plunger-case connected with said siphon and extended in approximately a horizontal plane and the plunger operating in said case, whereby its movement will be directed in a horizontal line, substantially as set forth.

2. The combination of the tank, the siphon, the plunger-case connected with said siphon and having an extension beyond the same, and a plunger operating in said case and movable past the juncture of the siphon and into the extension of the case, substantially as set forth.

3. The combination, with the tank and the flushing-pipe and devices, of the chain connected at one end therewith and disposed thence over guide-pulleys, and secured at its other end to a suitable support, and a movable bar having a pulley-bearing on the chain between the fixed end thereof and an adjacent guide-pulley, substantially as set forth.

4. The improvement in closets, substantially as described, consisting of the tank, the flushing-pipe having a siphon leading into the tank, a plunger-case connected with said siphon, a plunger operating in said case, a lever having a counterbalancing-weight and connected at one end with the plunger, the chain connected to the opposite end of the lever, disposed thence around guide-pulleys, and secured at its other end to a support, and a movable bar having a pulley bearing on the chain between its fixed end and an adjacent pulley, substantially as set forth.

AUGUST F. BLESCH.

Witnesses:
ALEX. W. KRAMM,
ANDREW SCHWARZ.